June 5, 1934.  J. CASTAÑEDA  1,961,659

LIFTING JACK

Filed Oct. 9, 1933

Inventor
José Castañeda
Geo. F. Kimmel
Attorney

Patented June 5, 1934

1,961,659

UNITED STATES PATENT OFFICE 1,961,659

LIFTING JACK

José Castañeda, Jalisco, Mexico

Application October 9, 1933, Serial No. 692,864
In Mexico November 8, 1932

1 Claim. (Cl. 254—94)

This invention relates to a jack designed primarily for use for lifting automobiles, trucks or other automotive vehicles, but it is to be understood that a jack, in accordance with this invention, may be employed in any connection for which it is found applicable, and the invention has for its object to provide, in a manner as hereinafter set forth, a device of the class referred to for automatically lifting the wheel of a vehicle from off the ground on the forward or rear movement of the vehicle and for maintaining the wheel in lifted position.

A further object of the invention is to provide, in a manner as hereinafter set forth, a jack including a grooved top for the reception of the flange of a brake drum of an automotive vehicle when the jack is disposed at an obtuse angle with respect to the axis of the drum and in non-righted position, and with the construction and arrangement of the jack being such as to cause the flange of the brake drum to ride up said grooved top on the forward or rearward movement of the vehicle for a short stretch whereby the wheel of the vehicle is automatically lifted from its supporting surface and the jack shifted to righted position to maintain the wheel in lifted position.

To the above ends essentially and to others which may hereinafter appear, the invention consists of a construction of lifting jack which falls within the scope of the invention as claimed.

Figure 1:
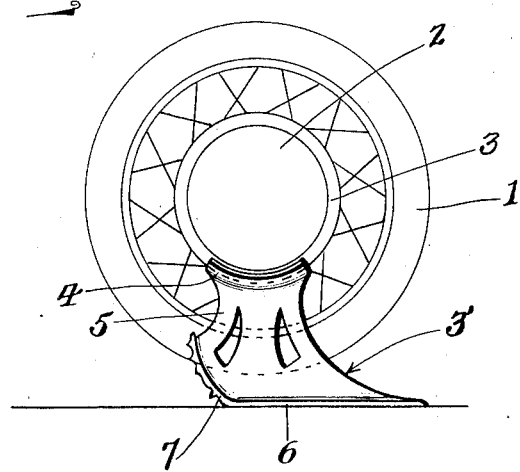
Figure 1 is a side elevation of a vehicle wheel in lifted position by and showing the adaptation therewith of the jack.
Figure 2:
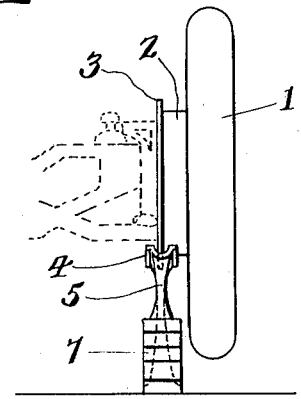
Figure 2 is an edge view of a vehicle wheel in lifted position by and showing the adaptation therewith of the jack.
Figure 3:
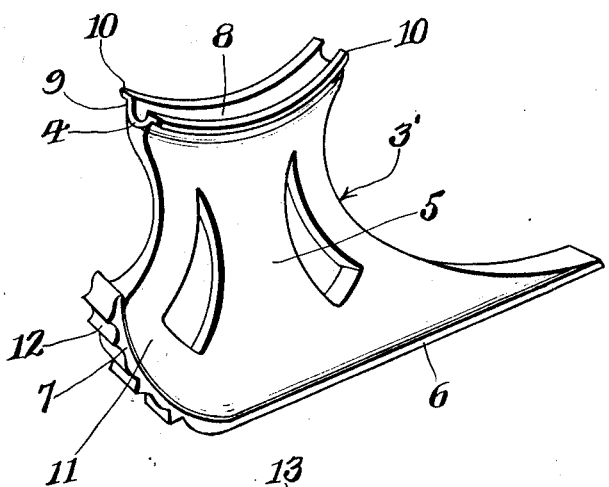
Figure 3 is a perspective view of the jack.
Figure 4:
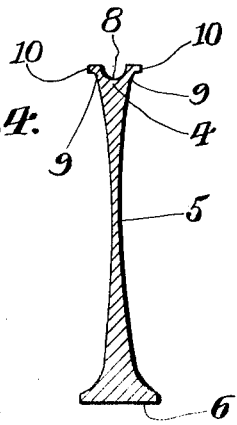
Figure 4 is a vertical sectional view of the jack.

Referring to the drawing, there is indicated a vehicle wheel 1, 2 a brake drum associated therewith and 3 an external annular flange on drum 2.

With reference to Figures 1 to 5, the jack indicated generally at 3′ is formed of a one-piece casting consisting of a horizontally disposed head part 4 of segmental contour, a vertically disposed apertured web part 5 substantially of tapered contour, a horizontally disposed base part 6 of oblong contour and an upstanding fulcrum part 7 of arcuate contour.

The base part 6 is flat and of greater length than that of head part 4. The leading end of the latter extends beyond the leading end of the base part 6. The follower end of the latter extends beyond the follower end of the head part 4. The distance which the follower end of the base part extends beyond the follower end of the head part is greater than that which the leading end of the head part extends beyond the leading end of the base part.

The web part 5 has its lower portion of greater width than its upper portion. The lower portion of web part 5 is extended laterally beyond the leading end of the head part 4 and the leading end of the base part 6. The extended leading side of the lower portion of web part 5 is termed a projection indicated at 11. The lower portion of web part 5 gradually increases in thickness toward base part 6. The lower portion of web part 5 has its leading and follower sides extending beyond the leading and follower sides respectively of the upper portion of said web part 5.

The head part 4 is of U-shape cross section to provide a curved open top groove 8 corresponding in length to that of and opening at each end of the head part. The outer face of each side 9 of head part 4 at its top is formed with an outwardly directed flange 10 corresponding in length to that of the head part.

The fulcrum part 7 is forwardly inclined and of greater height than and has its follower face integral with the outer end of projection 11. The fulcrum part 7 is of greater width than the thickness of and projects laterally in opposite directions from the leading side of the lower portion of the web part 5. The lower end of fulcrum part 7 merges into the leading end of the base part 6. The upper end of the fulcrum part 7 extends beyond the leading end of the base part 6. The upper end of fulcrum part 7 is spaced beyond the leading side of the upper portion of web part 5. The leading face of fulcrum part 7 is formed throughout with transversely extending teeth 12 which act to prevent the jack from bodily shifting when functioning to elevate and when holding the wheel in an elevated position. The fulcrum part 7 is of less length than the base part 6.

The groove 8 in the head part 4 is to receive a stretch of the drum flange 3 which seats upon the base of the wall of the groove. The flanges 10 of the head part are flush with the top edges of such part. When the drum flange 3 is positioned in the groove 8 the top edges and flanges of head part 4 bear against the drum 2 and provide spaced aligning supporting surfaces for the drum when the wheel is elevated.

Figure 5:
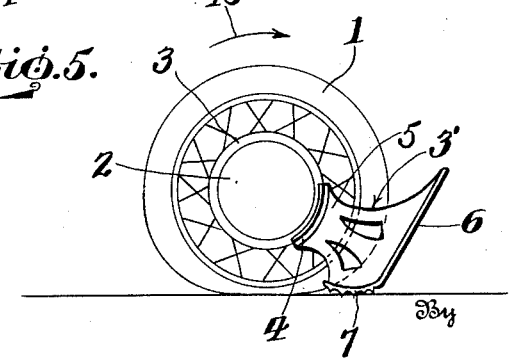
Figure 5 is a side elevation of a vehicle wheel in non-lifted position and showing the arrangement of the jack relative to the flange of the brake drum to provide for the lifting of the wheel when moving the vehicle for a short stretch.

With reference to Figure 5, the jack 3′ is arranged in position for lifting the wheel 1, and in such connection it is disposed at an obtuse angle with respect to drum 2, the stretch of the flange 3 of the latter being seated in groove 8, the flanges 10 bearing against drum 2 and the fulcrum part 7 supported on the surface upon which is mounted the wheel. Now if the wheel be propelled for a short stretch in the direction of the arrow 13, the flange 3 will ride up groove 8 and the part 7 will fulcrum in a direction to elevate itself to the position shown in Figure 1, whereby base part 4 will be positioned on the surface referred to and the wheel 1 lifted. On the movement of the wheel 1, for a short stretch in the direction of arrow 13, the jack will be shifted from the non-righted position shown in Figure 5 to the righted position illustrated in Figures 1 and 2 whereby the wheel will be lifted and maintained so for the period desired.

What I claim is:—

A jack comprising a segmental head part of U-shape contour in transverse cross section at any point throughout its length thereby providing a groove opening at the top and ends thereof and a pair of spaced parallel top edge portions, said part being formed from end to end of the upper marginal part of the outer faces of the sides thereof with outwardly directed continuous lateral flanges flush with and coacting with said edge portions providing a pair of spaced parallel supportive surfaces, a vertically disposed web part having its lower portion of greater width than its upper portion and extended beyond the leading side edge of said upper portion providing a forwardly extending lateral projection, a base part integral with the bottom of said lower portion, positioned rearwardly of the leading side edge of said upper portion and of greater length than said head part, an upstanding forwardly inclined fulcrum part of arcuate contour merging at its lower end into the leading end of the base part, having its follower side integral with the outer end of and extending laterally in opposite directions from the sides of said projection, formed with teeth disposed transversely of its leading face and being free of connection to the leading side edge of said upper portion, and the latter merging into the bottom of and flush with the sides and ends of said head part.

JOSÉ CASTAÑEDA.